INVENTORS:
Martin Danjes
August Schreiber

INVENTORS:
Martin Danjes
August Schreiber

United States Patent Office 3,490,752
Patented Jan. 20, 1970

3,490,752
AERATION DEVICE FOR SEWAGE PLANTS WITH BIOLOGICAL PURIFICATION
Martin Danjes, Hermannstrasse 3, Detmold, Germany, and August Schreiber, Bahnofstrasse 45, Hannover-Vinnhorst, Germany
Filed Jan. 31, 1967, Ser. No. 612,865
Claims priority, application Germany, Sept. 2, 1966, D 51,006
Int. Cl. C02c 1/02; B01d 47/02
U.S. Cl. 261—122                                  10 Claims

ABSTRACT OF THE DISCLOSURE

Apparatus for introducing fine air bubbles into sewage and waste water of a sewage treatment plant which involves biological purification with air treatment effected by impulse-like connection and disconnection from a compressed air source and said apparatus having membrane means to separate the apparatus into two sections.

---

Figure 1:
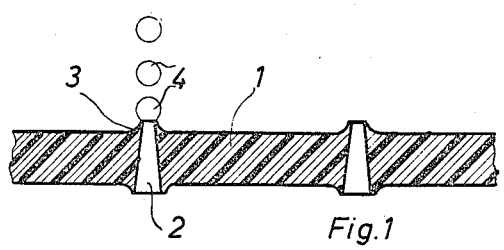

The present invention relates to an aeration device for introducing fine air bubbles into the sewage and waste water of a sewage or treatment plant operating on the principle of biological purification.

More particularly the efficiency of the aeration device, especially the oxygen enrichment of the sewage water within a certain time, depends on the introduction of air bubbles having a constant small diameter, which do not recombine during generation and on their way through the sewage liquid. Furthermore the constant small diameter of the bubbles should be maintained for any and all amounts of air demand.

In the aeration device known heretofore the size of the air bubbles depended on the amount of the introduced air as well as during spatial or temporal intermittent operation, the sewage slurry is subjected to the air at the side of the distributor thus blocking the hatches of air emerging from the openings, when resuming operation.

It is an important object of this invention to provide an aeration device urging the absorption of oxygen into the sewage water.

A further object of the present invention resides in the provision of an improved biological purification with a minimum of energy demand as well as a minimum of air requirements.

Another object is to inhibit blocking of the air distributor by particles of the sewage or by bacteria living in the sewage. This includes the principle of avoiding the entrance of sewage water into the interior of the aeration device and the air supplying pipes.

A still further object resides in the use of an air distributor having small hatches, underneath which an elastic watertight membrane is provided, which abuts against the air entering face of the air distributor under a predetermined pressure, whereby the air is introduced between the air distributor and the elastic membrane.

Another object resides in the use of an air distributor consisting of a foil having a screen of small hatches, whereby the air is introduced between the foil and the elastic membrane.

A further object of the invention resides in the provision of avoiding individual air bubbles adhering to the emerging face of the hatches of the foil and thus that such bubbles of different size are generated, in that each hatch of the foil is surrounded by a wall at the air emerging face of the foil.

Also it is an object of the invention to generate the pressure acting upon the second foil by a liquid column, an elastic body or an uplift body surrounded by a fluid or an air cushion.

A still further object resides in the use of an elastic foil as a boundary of a liquid against the supplied air and to use the air cushion underneath the perforated foil as a blocking agent to prevent the penetration of sewage water through the holes of the foil. A further improvement is to connect a vertically downwards directed pipe to the air cushion, whereby an air column is formed having the pressure equal to the displaced sewage water column.

It is a still further object of the invention to provide in the aeration device, a porous body in the direction of the air flow above the foil, the pores of which body are so narrow that the air remains therein also when the air supply is stopped and thus the sewage water is always separated from the upper side of the first foil.

Figure 2:
Figure 2:
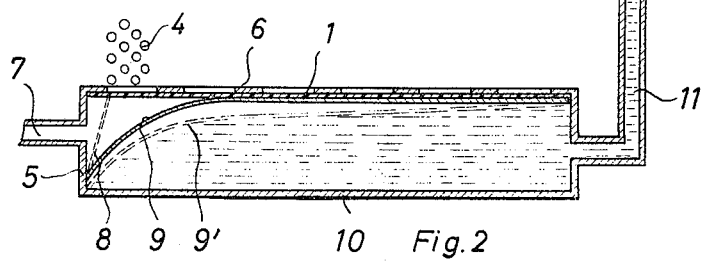
Figure 3:
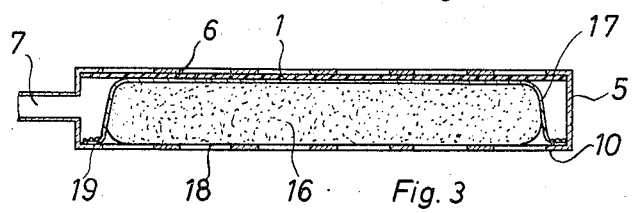
Figure 4:
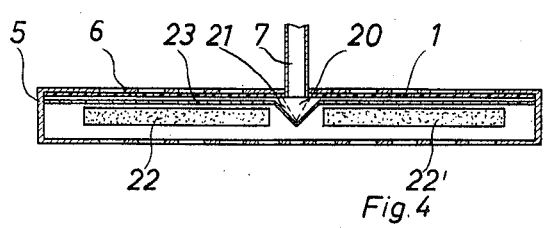
Figure 5:
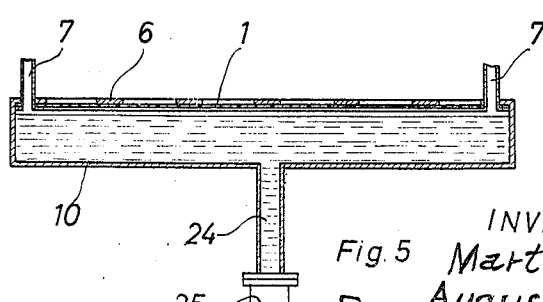
Figure 6:
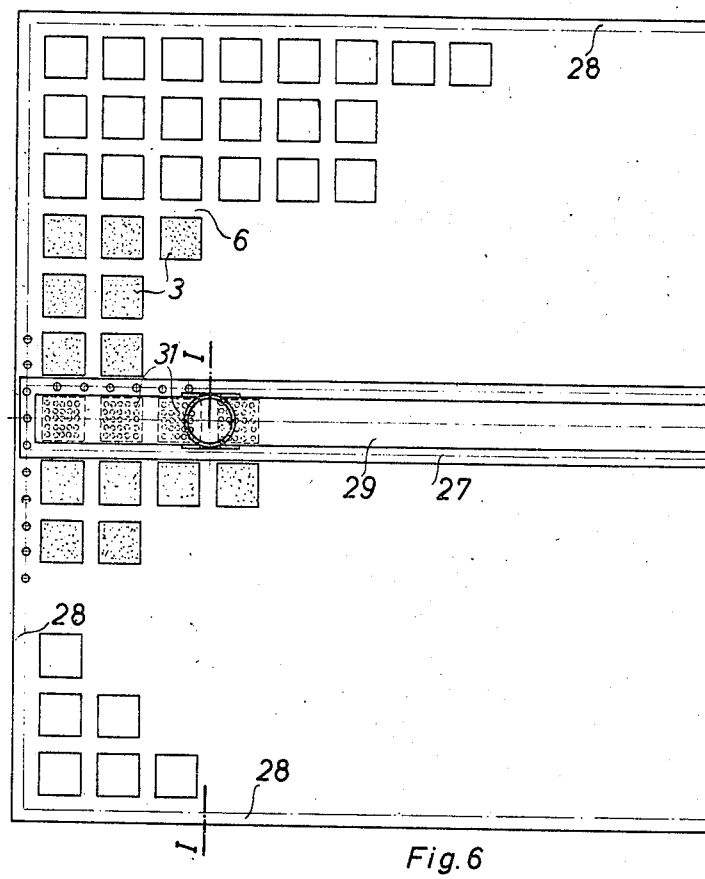
Figure 7:
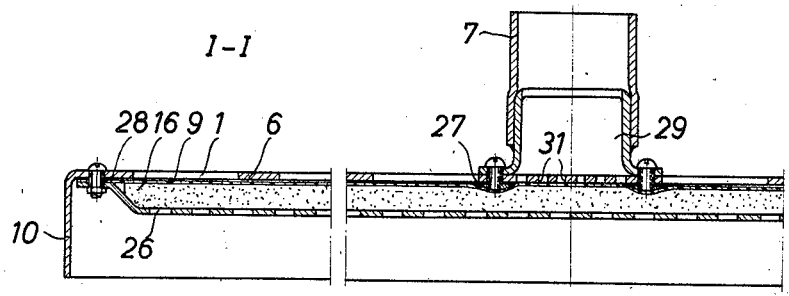
Figure 8:
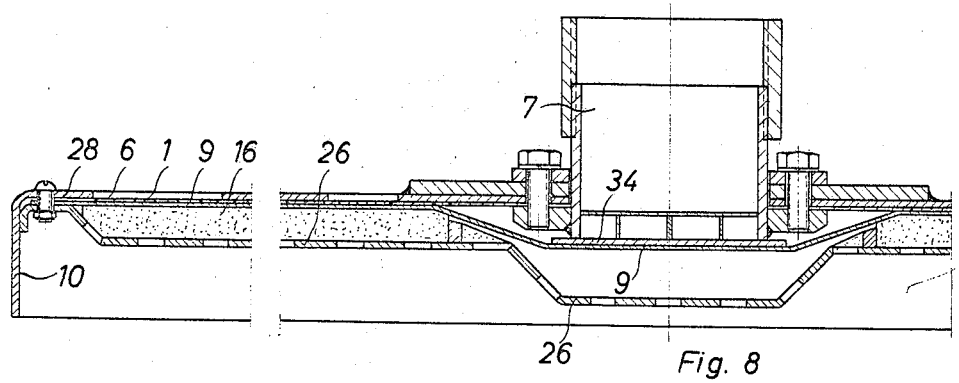
Figure 9:
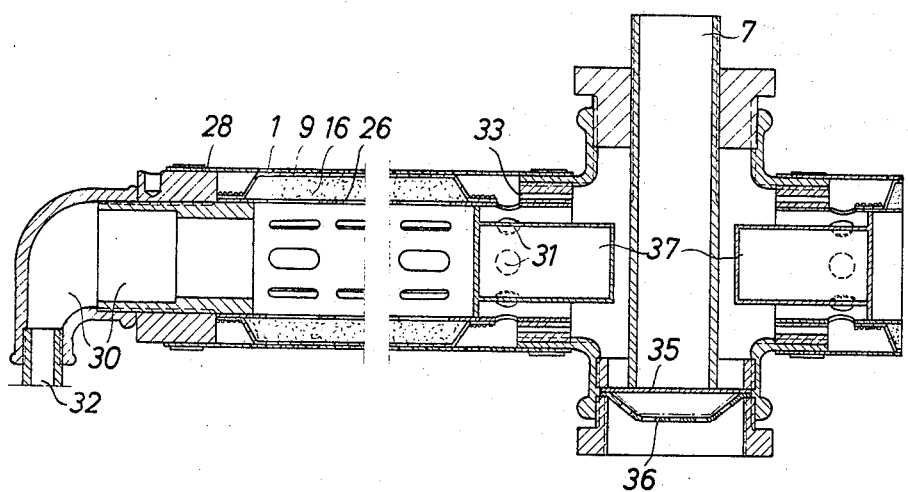
Figure 10:
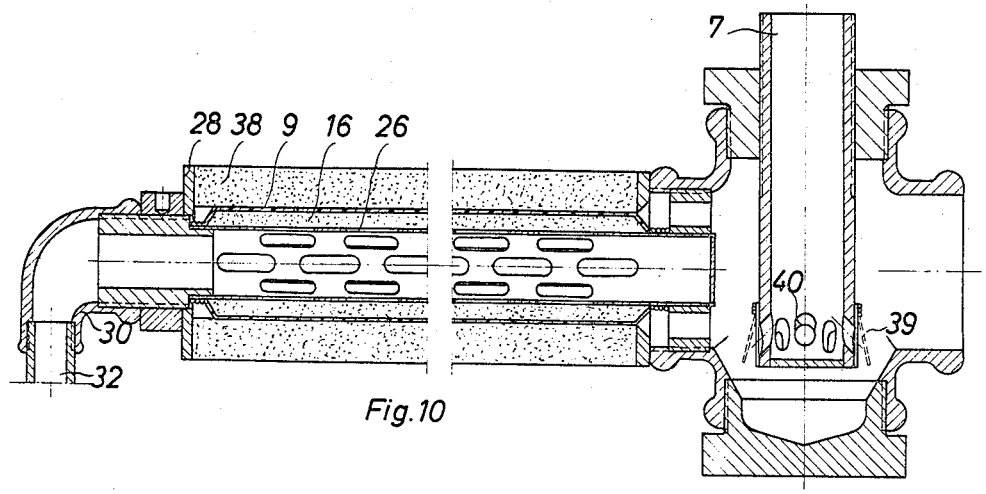
Figure 11:
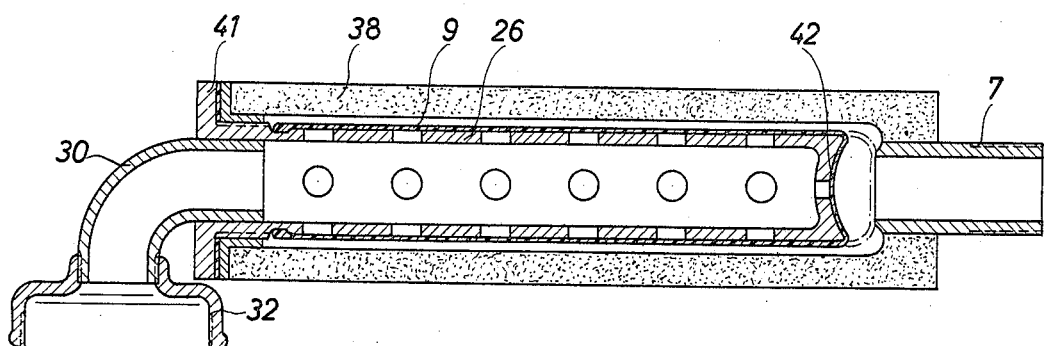

Other features and advantages of the invention together with its construction and method of operation will be best understood from the following description when considered in connection with the accompanying drawings, in which:

FIG. 1 is a longitudinal section of an embodiment of a portion of an air distributor foil, FIG. 2 is a vertical longitudinal section of an air distributor with a first foil being arranged above an elastic second foil, FIG. 3 is a vertical longitudinal section of an air distributor provided with an elastically supported second foil, FIG. 4 is a vertical cross section of an air distributor with two elastic uplift supporting means, FIG. 5 is a cross section of an air distributing box with a downwards directed pipe, FIG. 6 is a top plan view of a portion of an air distributor, FIG. 7 is a vertical section of a portion of the air distributor according to FIG. 6 taken on the line I—I, FIG. 8 is a vertical section of another embodiment of an air distributor, FIG. 9 is a longitudinal section of a cylindrical air distributor, FIG. 10 is a longitudinal section of a modified cylindrical air distributor covered by an additional porous layer, and FIG. 11 is a longitudinal section of a further modified embodiment of a cylindrical air distributor.

The structure of FIG. 1 comprises a foil 1 consisting of plastic material and perforated at regular distances to form hatches 2 each of which is surrounded by a wall or projection 3 at the air emerging face of the foil. The wall or rim 3 acts as an adhering or issuing surface for the individual bubbles 4 on the foil 1. The bubbles 4 start to rise and separate from the foil 1 only after they reach a certain diameter. If there is more air forced through the hatches 2, only a number of bubbles 4 generated within a certain time is augmented but not their size. The individual hatches or perforations 2 have a distance of at least ten times the diameter of the wall edge 3 from each other so that no bubbles adhering upon the walls can combine.

According to FIG. 2, a foil 1 is mounted under window-like perforated covering plates 6, which are fastened to upper flanges 5' of the side walls 5 of the air distributor 10. An air supply pipe 7 is connected to the distributor 10 through the side wall 5 and leads into the space between side wall 5 and a joining piece 8.

A second elastic foil 9 is fastened with one edge to the joining piece 8 and abuts against the first or top foil 1 under the pressure of a liquid column 11, which rises above the sewage water level 13 into a balance vessel 12.

By supplying air under pressure through pipe 7 the second foil 9 is partly directed downwards from the lower or bottom side of the foil 1, and the air emerges as a bubble current or flow 4 through the hatches or openings 2 in the foil 1 into the sewage water above.

The water being displaced by the raised part of the second foil 9 flows into the balancing vessel 12 through vertical pipe 11. As the balancing vessel 12 has a great free horizontal surface of the liquid level, this level is not noticeably increased by the added displaced water. Therefore a little increase of the pressure of the supplied air is sufficient to release a further surface of the foil 1.

With further increase of the supplied air amount the second foil 9 finally assumes the dashed line position 9′, in which the entire surface of foil 1 is released for the entrance of air. The active surface of the distributor is therefore substantially proportional to the interspersed air amount.

By closing the air supply through the pipe 7 a corresponding part of the displaced water flows from the balancing vessel 12 back through the rising pipe 11 and lifts the second foil 9 against the openings 2 of the foil 1. By this action the openings 2 are closed and prevent any entrance and flow of sewage water underneath foil 1.

A rising or vertical pipe 14 consisting of a transparent material is mounted upon the balancing vessel 12. At a blocking or an overload of the distributor, the water level enters the pipe 14 from the balancing vessel 12 and reaches a level 15, which is visible to the operator.

An air distributor 10 according to FIG. 3 is provided with an elastic cushion 16 which is provided with an elastic tight cover 17, which for instance may consist of a rubber foil. The foam material 16 is sufficiently compressed to close the openings 2 in foil 1 against the pressure of the sewage water, provided that air is introduced through pipe 7.

The lower surface of the distributor 10 is open to the sewage by means of openings 18 and therefore the flexible cushion 16 abuts against the foil 1 only by its own compression and weight. The edges 19 of the cover 17 are tightly sealed to the box 5 separating the sewage water from the air supplying space.

By introducing air through the pipe 7 an additional pressure is exerted on the body of foam material. By this, with increasing pressure also increasing parts of the surface of the foil 1 are released for the air entrance.

Using the uplift due to a corresponding difference regarding the specific weight of the cushion and the sewage water by providing a greater height of the air distributor box, the cushion of foam material thus floats freely, as shown by the embodiment of FIG. 4.

In the embodiment of FIG. 4 both bodies 22 and 22′ of foam material abut against an elastic foil 23, which is sealed along its edge to the box 5. That part of the foil 23 which is between both bodies 22 and 22′ of foam material is directed under the edge of two perforated metal sheets 21 which are connected similar to the letter V, so that the air from the pipe 7 enters through the perforated sheets 21, a space 20 formed above the foil 23 and below foil 1. The space 20 extends along the length of the air distributor.

In FIG. 5 an air distributor is shown using the border of a liquid against air to separate the air cushion from the liquid instead of a second foil. The air supplied through the pipes 7 spreads at first immediately underneath the foil 1 and forms an air cushion between the foil 1 and the liquid in the box or casing 10.

The box 10 is horizontally arranged at a certain distance below the sewage water level. At its lower side a vertical pipe 24 is connected, the lower end of the pipe being closed by a check valve or ball check valve 25.

The length of the vertical pipe 24 is a little greater than the air entering by resistance through the perforated foil 1 measured in inches of water column. When switching on the air supply the liquid is displaced by the air cushion by lowering the water level until the increase in pressure in the air cushion overcomes the boundary tension of the water against air at the mouths of the hatches or openings 2 and the bubble production begins. Thereby it is assured that the lower side of the perforated foil 1 is always facing an air cushion and cannot be reached by impurities. After closing the air supply the air cushion remains, as after a small rise of the water level, the air pressure becomes lower and the emanation of bubbles 4 stops. The check valve 25 inhibits that the liquid flows back too quickly into the air distributor box 5, especially at abrupt cessation of the air supply.

The air distributor plate partly shown in FIGS. 6 and 7 is suspended from the air supplying pipes 7.

The air enters the distributor channel 29 through the supply pipe 7 and reaches through bores 31 between the perforated foil 1 and the second foil 9. Foil 1 is sealed underneath the distributor channel 29 with a gasket 27. Foil 1 is sealed to the second foil 9 at the outer circumference 28 of the air distributor plate together with a perforated covering plate 6.

When the air enters the elastic material 16 it is compressed and the air spreads along the entire lower surface of the foil 1. If the supply of compressed air is stopped, the elastic material 16 is again pressed against the second foil 9 and this against foil 1. Furthermore the second foil 9 is pressed against the air supply openings 31 underneath the distributor channel 29, so that slurry which eventually penetrated through a defect between the first and the second foil cannot enter the air supply channel 29 and the air supply pipe 7.

The elastic material 16 is supported by a perforated plate 26. Underneath the casing 10 an air cushion is formed from gases developed in the sewage which forms an additional pressure from below upon the second foil 9.

Instead of an air supply conduit, the central supply pipe 7 is provided at the rectangular air distributing plate according to FIG. 8. The seond foil 9 is bent down like a bowl underneath the air supply pipe 7 and abuts against a supporting grid 34 arranged at the lower end of the air supply pipe. Sewage water which might have penetrated foil 1 flows into the bowl-like part of the second foil 9, however, it cannot penetrate the air supply pipe 7 and thus further air distributors, because the second foil 9 is pressed against the supporting grid 34 under the hydrostatic pressure of the sewage water column which is above the distributor.

The perforated plate 26 supports the body 16 of foam material and protects the second foil 9 from damage at the region underneath the air supplying pipe 7, if the air pressure is incidentally reaching to high levels.

At the pipe-shaped air distributor of FIG. 9 both the first foil 1 and the second foil 9 as well as the perforated supporting metal sheet 26 are concentrically arranged to one another. The air supplying pipe 7 is protected against penetration of sewage water by a special check valve 35. In a pipe 30, including the vertical part 32, an air cushion is formed by an accumulation of rising gas bubbles, the air cushion preventing the sewage water from entering the supporting pipe 26. The vertical pipe 32 may also be lead to a vessel arranged above the sewage water level and filled with pure water. In this case the vessel, pipe 32 and the space within the supporting pipe 26 are filled with pure water, which delivers the pressure of the second foil 9 on to the foil 1 together with that of the elastic supporting mass 16.

The supplied air emerges from the lower end of the air distributor pipe 7 by a lifting membrane 35 of the pipe 7, passes a displacing body 37 arranged to diminish the detrimental space and flows through bores 31 in the supporting pipe 26 between the second foil 9 and foil 1 and emerges from the openings of the first foil in the form of fine air bubbles. A perforated supporting sheet metal element 36 protects the membrane 35 against overstrain.

At the pipe-shaped air distributor according to FIG. 10, a pipe 38 of porous material is concentrically arranged around the foil 9, the radially extending pores of which have such a small diameter that the air remains therein after switching off the air supply so that the sewage cannot reach the upper side of the foil 9.

The check valve 39 arranged at the emerging end of the air supplying pipe 7 is formed as a labial valve, the annular lip of which is arranged over bores 40 in the end of the pipe 7.

An especially simple construction of a pipe-shaped air distributor is shown in FIG. 11. This air distributor consists of an aeration pipe 38 with fine pores, which corresponds to that described in FIG. 10 under the same reference numeral, in which at one side the air supply pipe 7 is affixed, while the downwards directed pipe 30 is inserted at the other end of the aeration pipe 38 into a joint 41. Pipe 30 is secured to a bell-shaped vertical piece or element 32, so that an air cushion within the supporting pipe 26 can be built up from the bubbles rising from the sewage water and which are caught in the bell 32.

The second foil 9 arranged above the supporting pipe is pressed against the inner wall of the aeration pipe 38 by the air cushion and closes with its end face part 42, and the pipe 7 when the air supply is stopped.

Although the present invention has been described with reference to particular embodiments thereof, it should be understood that those skilled in the art may make oher modifications and embodiments which will fall within the spirit and scope of the principles of this invention.

What is claimed and desired to be secured by Letters Patent of the United States is:

1. An air distributor for transferring supplied air into finely distributed air bubbles, especially for intermittently aerated biological sewage purification plants comprising a casing having an air entering side, an air distributing layer arranged in the casing and having an air emerging side, and a bubble discharge side, a tight elastic membrane arranged in abutting relation against the air entering side of said layer under a predetermined pressure, and an air supply pipe connected to the casing and discharging between the surface of the membrane and the air distributing layer.

2. An air distributor according to claim 1, in which a check valve is provided adjacent an end of the air supply pipe to avoid penetration of water through the air distributing layer into the air supply pipe and which is arranged below air emerging openings of the air distributing layer.

3. An air distributor according to claim 1, in which the air distributing layer forms an upper closure for the casing to produce the predetermined pressure, and in which a balancing vessel is provided connected to the casing, a side of the membrane which is opposite from the air distributing layer being in communication with the balancing vessel, and a liquid level within the balancing vessel lying above the liquid level of the sewage water.

4. An air distributor according to claim 1, in which an elastic material is provided in the casing, the pressure on the membrane being created by the elastic material which is compressed and which floats upwards and which is coated by a tight elastic cover.

5. An air distributor according to claim 1, in which the air distributing layer consists of a perforated foil having perforations therein at an air emerging side thereof and surrounded by projecting walls, the distance of the perforations from each other being at least equal to ten times the diameter of the respective walls.

6. An air distributor according to claim 1, in which an elastic material and a permeable supporting element are provided, with the elastic material arranged with an initial tension between the membrane and the permeable supporting element, and the membrane being mounted on the supporting element adjacent the edges of the elastic material.

7. An air distributor according to claim 1, in which a perforated covering plate is provided so that the air distributing layer is protected against an inner overpressure by the perforated covering plate lying thereon.

8. An air distributor according to claim 1, in which a rising pipe and a balancing vessel are provided with the pipe leading to the balancing vessel having a diameter that, if the air supply is suddenly stopped, the liquid flowing back from the balancing vessel has a velocity which is sufficient to maintain the emerging of the air from the air distributing layer until the membrane abuts.

9. An air distributor according to claim 1, in which the casing has edges with the casing being open at the bottom.

10. An air distributor according to claim 1, in which a porous supporting body is provided arranged at the emerging side of the air distributing layer, the pores of which body are so small that they remain filled with air when the air supply is stopped.

References Cited

UNITED STATES PATENTS

| 1,319,646 | 10/1919 | Eccleston | 261—122 X |
| 1,642,051 | 9/1927 | Wall | 261—122 |
| 1,717,713 | 6/1929 | Logan | 261—122 |
| 1,743,926 | 1/1930 | Lord | 261—122 |
| 2,049,333 | 7/1936 | Snethkamp | 261—122 |
| 2,978,234 | 4/1961 | Lamb | 261—122 |

FOREIGN PATENTS

| 597,951 | 5/1960 | Canada. |

OTHER REFERENCES

Awler, German Printed Application No. 1,029,754.

TIM R. MILES, Primary Examiner

U.S. Cl. X.R.
210—220; 261—124